(12) United States Patent
Lin

(10) Patent No.: US 7,063,102 B2
(45) Date of Patent: Jun. 20, 2006

(54) AIR TAP ASSEMBLY

(75) Inventor: Ping-Ting Lin, Taichung (TW)

(73) Assignee: Feng Yi Outdoor Leisure Equipment Enterprise Co., Ltd., Long Ching Hsiang (TW)

( * ) Notice: Subject to any disclaimer, the term of this patent is extended or adjusted under 35 U.S.C. 154(b) by 363 days.

(21) Appl. No.: 10/662,926

(22) Filed: Sep. 12, 2003

(65) Prior Publication Data

US 2005/0056314 A1 Mar. 17, 2005

(51) Int. Cl.
*F16K 15/20* (2006.01)
(52) U.S. Cl. ........................ 137/223; 251/349; 251/354
(58) Field of Classification Search ................ 137/223; 251/349, 351, 354
See application file for complete search history.

(56) References Cited

U.S. PATENT DOCUMENTS

| | | | |
|---|---|---|---|
| 1,329,141 A * | 1/1920 | Rice | 251/148 |
| 2,162,743 A * | 6/1939 | Norbom | 251/147 |
| 2,859,932 A * | 11/1958 | Mackal | 251/349 |
| 5,111,838 A * | 5/1992 | Langston | 137/223 |
| 6,227,240 B1 * | 5/2001 | Wu et al. | 137/543.19 |
| 6,314,984 B1 * | 11/2001 | Barriendos et al. | 137/223 |
| 6,622,749 B1 * | 9/2003 | Li | 251/83 |

* cited by examiner

*Primary Examiner*—John Rivell
(74) *Attorney, Agent, or Firm*—Alan D. Kamrath; Nikolai & Mersereau, P.A.

(57) ABSTRACT

An air tap assembly includes an air pipe having an outer wall formed with a plurality of locking members, and a valve cap rotatably and movably mounted on the air pipe and having an inner wall formed with a plurality of locking members. Thus, the locking members of the valve cap are engaged with and detached from the locking members of the air pipe easily and rapidly, so that the valve cap is locked on and released from the air pipe easily, and the air cushion can be inflated and deflated rapidly, thereby facilitating the user inflating or deflating the air cushion.

16 Claims, 6 Drawing Sheets

AIR TAP ASSEMBLY

BACKGROUND OF THE INVENTION

1. Field of the Invention

The present invention relates to an air tap assembly, and more particularly to an air tap assembly for an automatically inflatable air cushion.

2. Description of the Related Art

A conventional air tap in accordance with the prior art shown in FIG. 7 comprises an air pipe 10, and a valve cap 20. The air pipe 10 has a first end formed with a toothed portion 16 inserted into the valve seat 30 of the air cushion 32 and a second end formed with a locking portion 12 formed with an annular groove 13 for receiving a washer 11. The air pipe 10 has an inner wall formed with an air conduit 101 communicating with the valve seat 30 of the air cushion 32 and an outer wall formed with an outer thread 14 and a plurality of snapping portions 15. The valve cap 20 is mounted on the air pipe 10 and has a top formed with an adjusting valve 21 mounted in the annular groove 13 of the air pipe 10 and rested on the washer 11. The adjusting valve 21 of the valve cap 20 has a distal end formed with a conical portion 23 inserted into the washer 11. The top of the valve cap 20 is formed with a plurality of air vents 22 each communicating with the air conduit 101 of the air pipe 10 when the adjusting valve 21 of the valve cap 20 is detached from the annular groove 13 of the air pipe 10. The valve cap 20 has an inner wall formed with an inner thread 24 screwed on the outer thread 14 of the air pipe 10. Thus, the valve cap 20 can be rotated relative to the air pipe 10, so that the adjusting valve 21 of the valve cap 20 is detached from the annular groove 13 of the air pipe 10, thereby connecting the air vents 22 of the valve cap 20 with the air conduit 101 of the air pipe 10, so as to inflate or deflate the air cushion 32.

However, the conical portion 23 of the adjusting valve 21 of the valve cap 20 is inserted into and detached from the washer 11 successively due to rotation of the valve cap 20, so that the washer 11 easily produces elastic fatigue, thereby decreasing the sealing effect. In addition, the washer 11 is easily displaced due to movement of the adjusting valve 21 of the valve cap 20, thereby decreasing the sealing effect. Further, the inner thread 24 of the valve cap 20 is successively rotated by the valve cap 20 to be screwed on and unscrewed from the outer thread 14 of the air pipe 10, thereby slowing the inflating process, and thereby easily wearing the inner thread 24 of the valve cap 20 and the outer thread 14 of the air pipe 10.

SUMMARY OF THE INVENTION

The primary objective of the present invention is to provide an air tap assembly for an automatically inflatable air cushion.

Another objective of the present invention is to provide an air tap assembly, wherein the locking members of the valve cap are engaged with and detached from the locking members of the air pipe easily and rapidly, so that the valve cap is locked on and released from the air pipe easily and rapidly.

A further objective of the present invention is to provide an air tap assembly, wherein the valve cap is locked on and released from the air pipe easily and rapidly, so that the air cushion can be inflated and deflated easily and rapidly, thereby facilitating the user inflating or deflating the air cushion.

A further objective of the present invention is to provide an air tap assembly, wherein the user only needs to rotate the valve cap relative to the air pipe so as to inflate and deflate the air cushion, thereby facilitating the user operating the air tap assembly.

A further objective of the present invention is to provide an air tap assembly, wherein the user only needs to press and rotate the valve cap relative to the air pipe so as to lock the valve cap on the air pipe rapidly, thereby facilitating the user operating the air tap assembly.

In accordance with the present invention, there is provided an air tap assembly, comprising:

an air pipe having an outer wall formed with a plurality of locking members; and a valve cap rotatably and movably mounted on the air pipe and having an inner wall formed with a plurality of locking members each engaged on a bottom of a respective one of the locking members of the air pipe.

Further benefits and advantages of the present invention will become apparent after a careful reading of the detailed description with appropriate reference to the accompanying drawings.

DETAILED DESCRIPTION OF THE INVENTION

Figure 1:
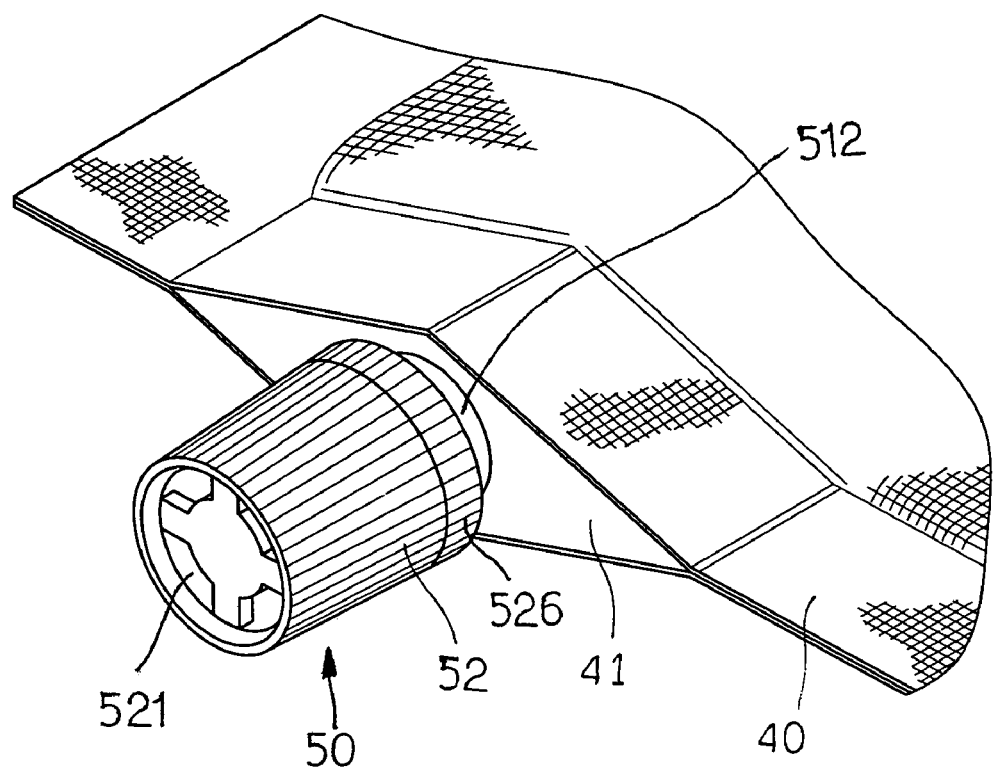
FIG. 1 is a perspective view of an air tap assembly in accordance with the preferred embodiment of the present invention.
Figure 2:
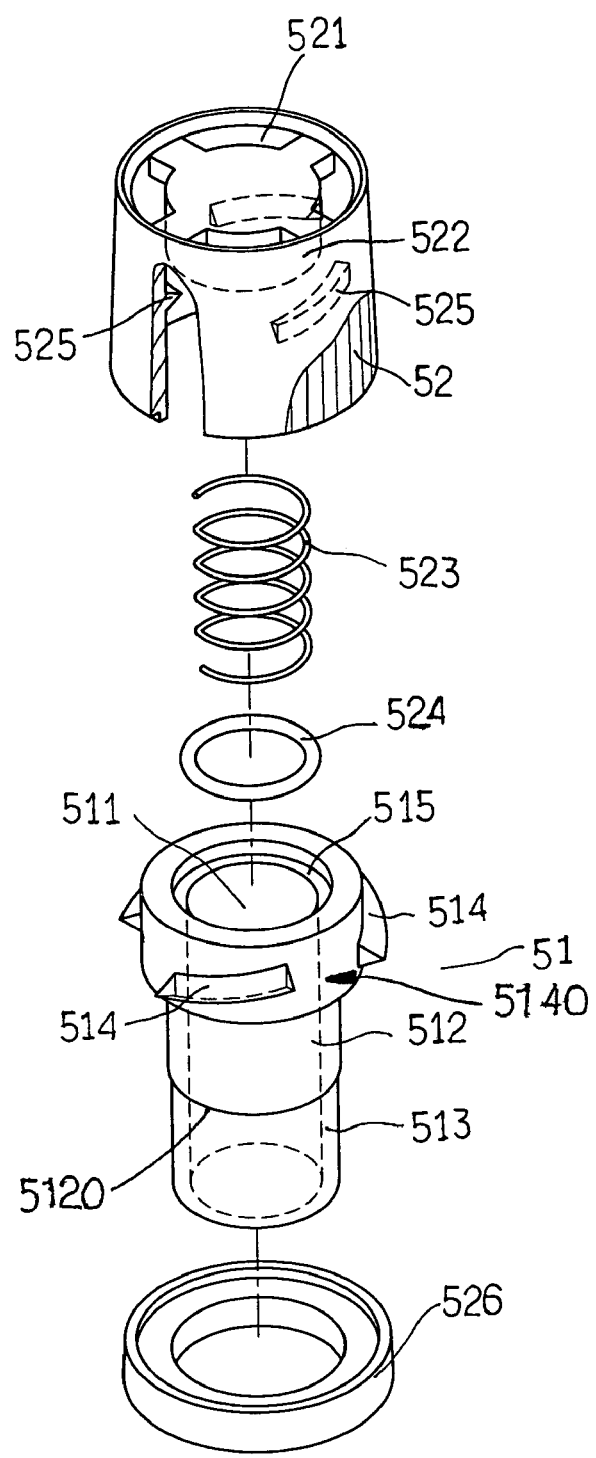
FIG. 2 is an exploded perspective view of the air tap assembly in accordance with the preferred embodiment of the present invention.
Figure 3:
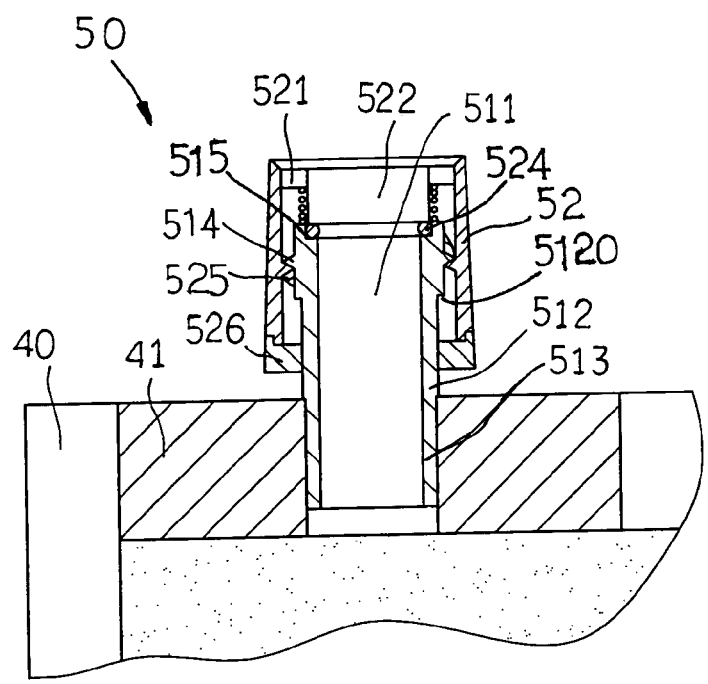
FIG. 3 is a plan cross-sectional view of the air tap assembly as shown in FIG. 1.

Referring to the drawings and initially to FIGS. 1–3, an air tap assembly 50 in accordance with the preferred embodiment of the present invention is mounted on the valve seat 41 of an automatically inflatable air cushion 40 and comprises an air pipe 51, and a valve cap 52.

The air pipe 51 has an inner wall formed with an air conduit 511 communicating with the valve seat 41 of the air cushion 40. The air pipe 51 has a top formed with an annular groove 515 communicating with the air conduit 511. The air pipe 51 has an outer wall formed with a plurality of locking members 514. Preferably, the locking members 514 of the air pipe 51 are arranged in a helical manner, and are located at the same height. In addition, each of the locking members 514 of the air pipe 51 has a wedge shape. In addition, the outer wall of the air pipe 51 is formed with a plurality of passages 5140 located between the locking members 514 of the air pipe 51. The air pipe 51 has a mediate portion formed with a locking ring 512 secured on the valve seat 41 of the air cushion 40. The locking ring 512 of the air pipe 51 has a lower end formed with an insert 513 inserted into and locked in the valve seat 41 of the air cushion 40.

The valve cap 52 is rotatably and movably mounted on the air pipe 51, and has a top formed with an adjusting valve 522 detachably mounted in the annular groove 515 of the air pipe 51. The adjusting valve 522 of the valve cap 52 is extended downward from the top of the valve cap 52. The top of the valve cap 52 is formed with a plurality of air vents 521 each communicating with the air conduit 511 of the air pipe 51 when the adjusting valve 522 of the valve cap 52 is detached from the annular groove 515 of the air pipe 51. The valve cap 52 includes a spring 523 mounted on the adjusting valve 522 and having a first end urged on the top of the valve cap 52 and a second end urged on the top of the air pipe 51. The valve cap 52 further includes a washer 524 mounted in the annular groove 515 of the air pipe 51 and rested on a bottom of the adjusting valve 522 of the valve cap 52. The valve cap 52 further includes a mounting seat 526 secured on a bottom of the valve cap 52 to move therewith and having an inner wall slidably mounted on the locking ring 512 of the air pipe 51. Preferably, the locking ring 512 of the air pipe 51 has a top formed with a stop portion 5120 rested on the inner wall of the mounting seat 526 when the mounting seat 526 is moved to the top of the locking ring 512 of the air pipe 51. The valve cap 52 has an inner wall formed with a plurality of locking members 525 each engaged on a bottom of a respective one of the locking members 514 of the air pipe 51. Preferably, the locking members 525 of the valve cap 52 are arranged in a helical manner, and are located at the same height. In addition, each of the locking members 525 of the valve cap 52 has a wedge shape.

Figure 4:
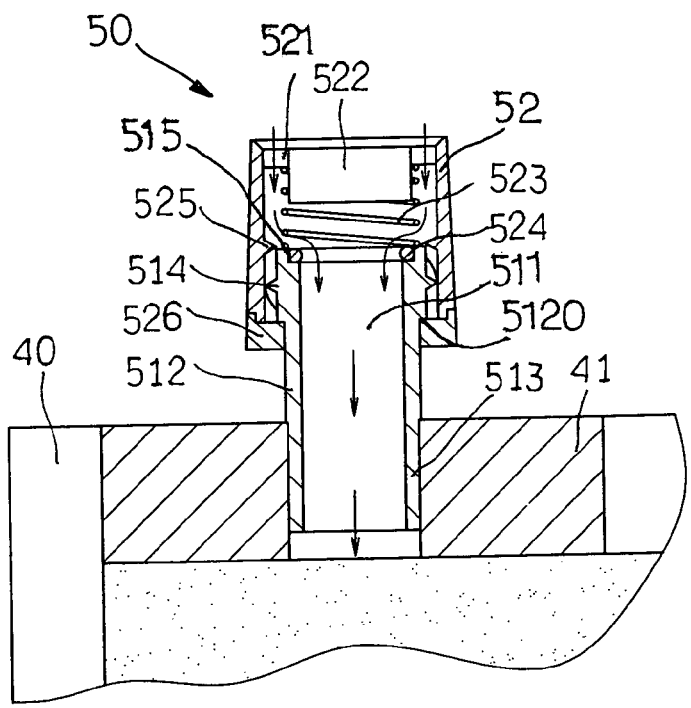
FIG. 4 is a schematic operational view of the air tap assembly as shown in FIG. 3.
Figure 5:
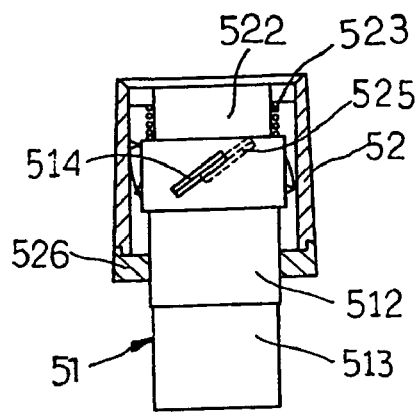
FIG. 5 is a plan cross-sectional view of the air tap assembly as shown in FIG. 1.

In operation, referring to FIGS. 3–5 with reference to FIGS. 1 and 2, the adjusting valve 522 of the valve cap 52 is initially mounted in the annular groove 515 of the air pipe 51 as shown in FIG. 3, thereby blocking connection between the air vents 521 of the valve cap 52 and the air conduit 511 of the air pipe 51. At this time, each of the locking members 525 of the valve cap 52 is engaged on the bottom of a respective one of the locking members 514 of the air pipe 51 as shown in FIG. 5, so that the adjusting valve 522 of the valve cap 52 is closely mounted in the annular groove 515 of the air pipe 51 as shown in FIG. 3, and the valve cap 52 is secured on the air pipe 51.

Figure 5A:
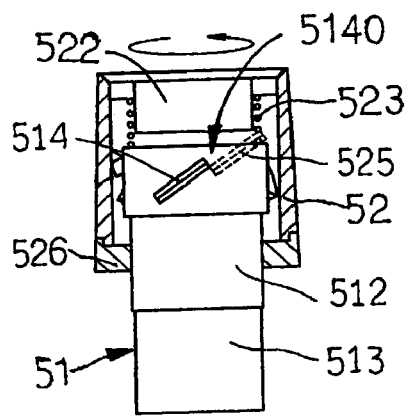
FIG. 5A is a schematic operational view of the air tap assembly as shown in FIG. 5.
Figure 5B:
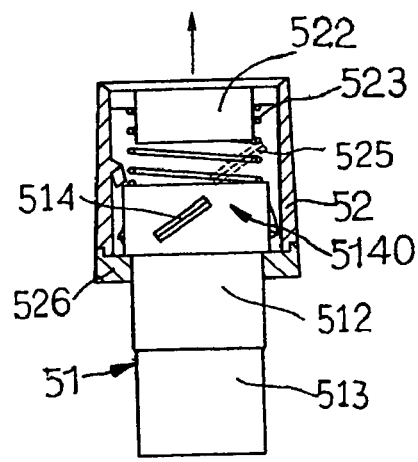
FIG. 5B is a schematic operational view of the air tap assembly as shown in FIG. 5A.

When the valve cap 52 is rotated relative to the air pipe 51 to move from the position as shown in FIG. 5 to the position as shown in FIG. 5A, each of the locking members 525 of the valve cap 52 is detached from a respective one of the locking members 514 of the air pipe 51 and is aligned with a respective one of the passages 5140 of the air pipe 51, so that the valve cap 52 is pushed upward relative to the air pipe 51 by the restoring force of the spring 523 to move from the position as shown in FIGS. 3 and 5A to the position as shown in FIGS. 4 and 5B, such that the adjusting valve 522 of the valve cap 52 is detached from the annular groove 515 of the air pipe 51 as shown in FIG. 4, thereby connecting the air vents 521 of the valve cap 52 and the air conduit 511 of the air pipe 51.

Thus, the air of the ambient environment can be introduced through the air vents 521 of the valve cap 52 and the air conduit 511 of the air pipe 51 into the valve seat 41 of the air cushion 40 as shown in FIG. 4 for inflating or deflating the air cushion 40.

Alternatively, the valve cap 52 is pushed downward relative to the air pipe 51 and is then rotated relative to the air pipe 51, so that each of the locking members 525 of the valve cap 52 is engaged on the bottom of a respective one of the locking members 514 of the air pipe 51, and the valve cap 52 is secured on the air pipe 51 as shown in FIGS. 3 and 5.

Accordingly, the locking members 525 of the valve cap 52 are engaged with and detached from the locking members 514 of the air pipe 51 easily and rapidly, so that the valve cap 52 is locked on and released from the air pipe 51 easily and rapidly. In addition, the valve cap 52 is locked on and released from the air pipe 51 easily and rapidly, so that the air cushion 40 can be inflated and deflated easily and rapidly, thereby facilitating the user inflating or deflating the air cushion 40. Further, the user only needs to rotate the valve cap 52 relative to the air pipe 51 so as to inflate and deflate the air cushion 40, thereby facilitating the user operating the air tap assembly. Further, the user only needs to press and rotate the valve cap 52 relative to the air pipe 51 so as to lock the valve cap 52 on the air pipe 51 rapidly, thereby facilitating the user operating the air tap assembly.

Figure 6:
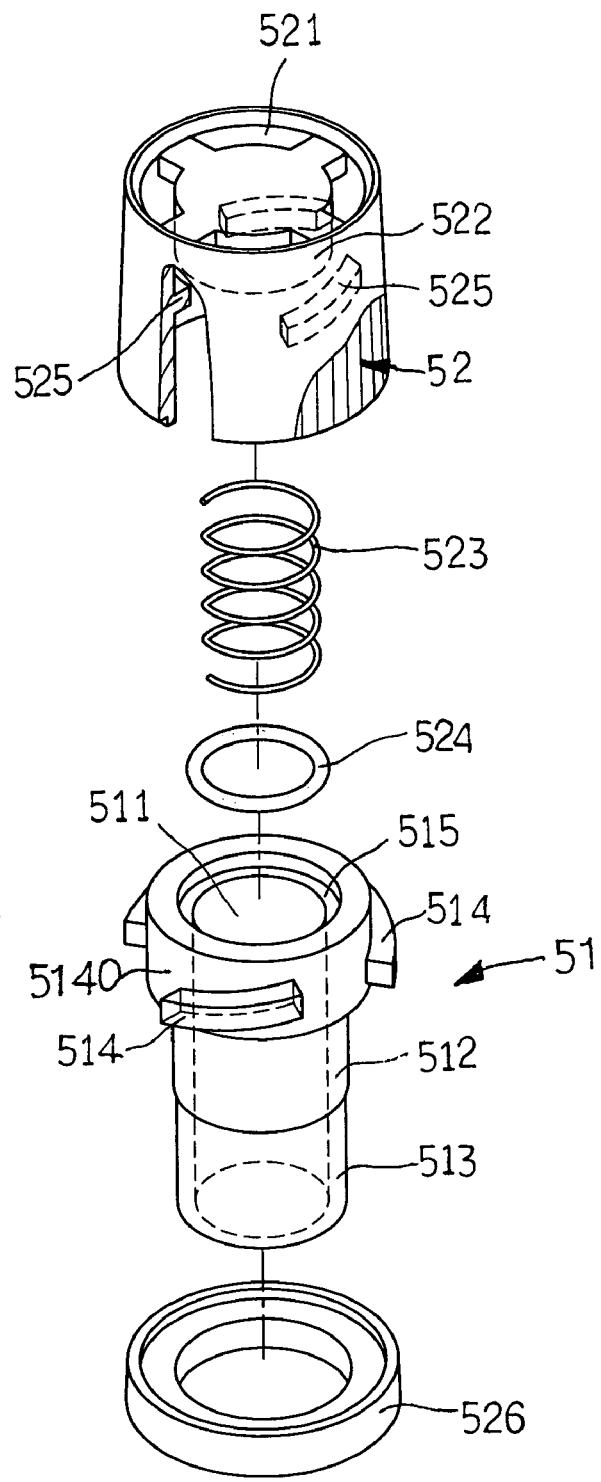
FIG. 6 is an exploded perspective view of an air tap assembly in accordance with another embodiment of the present invention.
Figure 7:
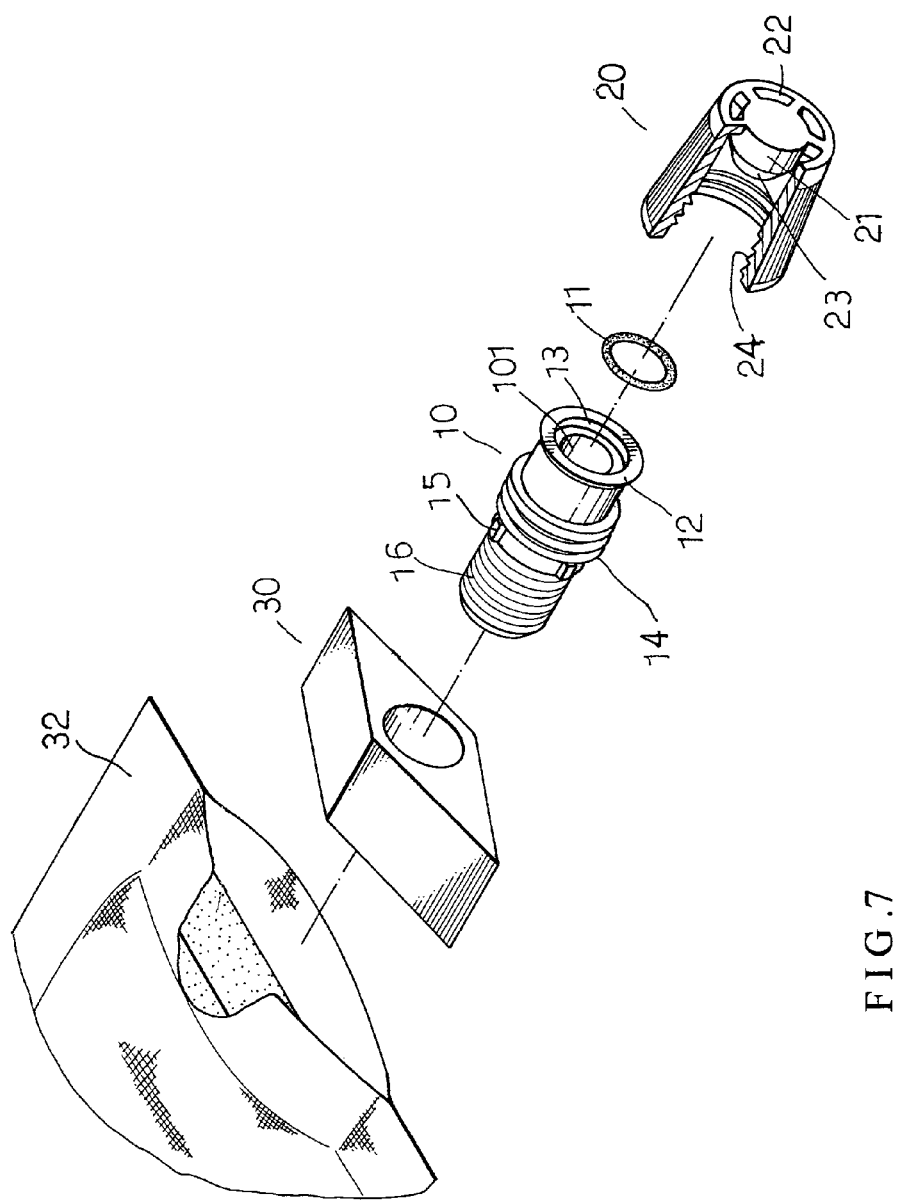
FIG. 7 is an exploded perspective view of a conventional air tap in accordance with the prior art.

Referring to FIG. 6, an air tap assembly in accordance with another embodiment of the present invention is shown, wherein each of the locking members 525 of the valve cap 52 has a strip shape, and each of the locking members 514 of the air pipe 51 has a strip shape.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An air tap assembly, comprising:
   an air pipe having an outer wall formed with a plurality of locking members; and
   a valve cap rotatably and movably mounted on the air pipe and having an inner wall formed with a plurality of locking members each engaged on a bottom of a respective one of the locking members of the air pipe; wherein
   the air pipe has a mediate portion formed with a locking ring secured on a valve seat of an air cushion;
   the valve cap further includes a mounting seat secured on a bottom of the valve cap to move therewith and having an inner wall slidably mounted on the locking ring of the air pipe.

2. The air tap assembly in accordance with claim 1, wherein the locking members of the air pipe are arranged in a helical manner, and are located at the same height.

3. The air tap assembly in accordance with claim 1, wherein each of the locking members of the air pipe has a wedge shape.

4. The air tap assembly in accordance with claim 1, wherein the outer wall of the air pipe is formed with a plurality of passages located between the locking members of the air pipe.

5. The air tap assembly in accordance with claim 1, wherein the locking members of the valve cap are arranged in a helical manner and are located at the same height.

6. The air tap assembly in accordance with claim 1, wherein each of the locking members of the valve cap has a wedge shape.

7. The air tap assembly in accordance with claim 1, wherein the air pipe has an inner wall formed with an air conduit and has a top formed with an annular groove communicating with the air conduit, and the valve cap has a top formed with an adjusting valve detachably mounted in the annular groove of the air pipe.

8. The air tap assembly in accordance with claim 7, wherein the adjusting valve of the valve cap is extended downward from the top of the valve cap.

9. The air tap assembly in accordance with claim 7, wherein the top of the valve cap is formed with a plurality of air vents each communicating with the air conduit of the air pipe when the adjusting valve of the valve cap is detached from the annular groove of the air pipe.

10. The air tap assembly in accordance with claim 7, wherein the valve cap includes a spring mounted on the adjusting valve and having a first end urged on the top of the valve cap and a second end urged on the top of the air pipe.

11. The air tap assembly in accordance with claim 7, wherein the valve cap further includes a washer mounted in the annular groove of the air pipe and rested on a bottom of the adjusting valve of the valve cap.

12. The air tap assembly in accordance with claim 1, wherein the locking ring of the air pipe has a lower end formed with an insert inserted into and locked in the valve seat of the air cushion.

13. The air tap assembly in accordance with claim 1, wherein the locking ring of the air pipe has a top formed with a stop portion rested on the inner wall of the mounting seat when the mounting seat is moved to the top of the locking ring of the air pipe.

14. The air tap assembly in accordance with claim 7, wherein when each of the locking members of the valve cap is engaged on the bottom of a respective one of the locking members of the air pipe, the adjusting valve of the valve cap is mounted in the annular groove of the air pipe, and the valve cap is secured on the air pipe.

15. The air tap assembly in accordance with claim 7, wherein the outer wall of the air pipe is formed with a plurality of passages located between the locking members of the air pipe, and when each of the locking members of the valve cap is detached from a respective one of the locking members of the air pipe, each of the locking members of the valve cap is aligned with a respective one of the passages of the air pipe, so that the valve cap is movable relative to the air pipe to detach the adjusting valve of the valve cap from the annular groove of the air pipe.

16. The air tap assembly in accordance with claim 1, wherein each of the locking members of the valve cap has a strip shape, and each of the locking members of the air pipe has a strip shape.

* * * * *